(12) United States Patent
Klingström

(10) Patent No.: US 11,294,460 B2
(45) Date of Patent: Apr. 5, 2022

(54) EYE EVENT DETECTION

(71) Applicant: Tobii AB, Danderyd (SE)

(72) Inventor: Andreas Klingström, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 17/117,767

(22) Filed: Dec. 10, 2020

(65) Prior Publication Data

US 2021/0173479 A1 Jun. 10, 2021

(30) Foreign Application Priority Data

Dec. 10, 2019 (SE) .................................. 1951422-3

(51) Int. Cl.
*G06F 3/01* (2006.01)
*G06K 9/00* (2006.01)

(52) U.S. Cl.
CPC ........... *G06F 3/013* (2013.01); *G06K 9/0061* (2013.01); *G06K 9/00335* (2013.01)

(58) Field of Classification Search
CPC .. G06F 3/013; G06K 9/00335; G06K 9/0061; G06K 9/00604; G06K 9/00617; G06K 9/00597; G06T 7/74; A61B 3/113; A61B 3/0008; A61B 3/14; A61B 3/0025; A61B 3/145; G02B 27/0093; G02B 27/0172; G02B 2027/0138; G02B 2027/014
See application file for complete search history.

(56) References Cited

U.S. PATENT DOCUMENTS

| | | | | |
|---|---|---|---|---|
| 5,357,293 | A * | 10/1994 | Uomori .................. | A61B 3/113 351/209 |
| 2010/0328444 | A1* | 12/2010 | Blixt ...................... | A61B 3/145 348/78 |
| 2015/0131051 | A1* | 5/2015 | Huang .................. | A61B 3/0025 351/206 |
| 2017/0123488 | A1* | 5/2017 | Guenter ............. | G06K 9/00597 |
| 2019/0042842 | A1* | 2/2019 | Cavin ....................... | G06T 7/74 |

* cited by examiner

*Primary Examiner* — Abhishek Sarma
(74) *Attorney, Agent, or Firm* — Samuel I. Yamron

(57) ABSTRACT

A method for detecting an eye event of a user using an eye tracking system, the method comprising capturing a first image of a first eye of a user, capturing an image of a second eye of the user a first period after capturing the first image of the first eye and a second period before capturing a next image of the first eye, capturing a second image of the first eye the second period after capturing the image of the second eye, determining that an eye event has occurred based on a difference between the first and second images of the first eye, and performing at least one action if it is determined that that an eye event has occurred.

18 Claims, 5 Drawing Sheets

EYE EVENT DETECTION

CROSS-REFERENCE TO RELATED APPLICATION

The present application claims benefit to Swedish patent application No. 1951422-3, filed Dec. 19, 2019, entitled "EYE EVENT DETECTION", and is hereby incorporated by reference in its entirety.

FIELD

The present disclosure generally relates to detecting eye events related to a user of an eye tracking system. More specifically, the present disclosure relates to a method and system for detecting an eye event of a user and performing an appropriate action.

BACKGROUND

Eye tracking systems monitor the eyes of a user to determine a gaze position and/or direction of the user, and then use this information to control an apparatus. For example, such systems can detect if a user is looking at an icon on a screen, and can interact with that icon on a screen if the user's gaze settles on the icon for a given period of time.

One of the drawbacks of current eye tracking systems is latency. This is the time interval between the occurrence of an eye event, for example a movement of the eyeball or a blink, and the time at which the event is processed by the eye tracking system. In current systems, latency can be due to the frame rates of cameras used to monitor the eyes, data transfer between different parts of the system, processing of data to calculate relevant outputs, and other delays inherent to eye tracking systems.

As a user's gaze moves around, information on when and where the gaze is moving is fundamental to providing responsive and reliable eye tracking functionality. Quick and accurate processing of eye events can significantly increase the performance of an eye tracking system. This is particularly true in systems that use foveated rendering, where rendering quality is reduced outside of a particular gaze zone of the user in order to reduce the workload of the system.

Therefore, a system and method is required that can reduce the latency present in current eye tracking systems.

SUMMARY

The present disclosure provides a method and system for detecting an eye event using an eye tracking system that reduces the latency between the occurrence of the eye event and a corresponding action performed by the system. This is achieved by interlacing image capture from one eye with image capture from the other eye.

In current eye tracking systems, images of both left and right eyes are captured simultaneously. Successive images are required to determine if an eye event has occurred, based on detecting a difference between the images. Therefore, the speed at which eye events can be detected is limited by the frame rates of cameras that are used to monitor the eyes. However, it has been determined that the left and right eye move generally in sync. That is to say, when an eye event occurs, for example, a movement of the eyeball or a blink, the event occurs in both the left and right eyes simultaneously. As such, the eye event need only be detected in one of the two eyes for relevant information to be captured and used by the system.

In the present disclosure, this information is used to implement a system where the left and right eyes are monitored separately, and image capture from one eye is interlaced with image capture from the other eye. Therefore, successive images of a given eye can be captured earlier than in cases where the eyes are imaged simultaneously, and eye events can be detected sooner after they occur. By taking this approach, the frame rate of image capture can be effectively doubled, and so the time from an eye event occurring to it being detected can be reduced. On average, the time from an eye event occurring to it being detected is reduced by a factor of two, although higher or lower factors of reduction are also possible. This in turn reduces the overall latency of the system.

In accordance with an aspect of the disclosure, there is provided a method for detecting an eye event of a user using an eye tracking system, the method comprising capturing a first image of a first eye of a user, capturing an image of a second eye of the user a first period after capturing the first image of the first eye and a second period before capturing a next image of the first eye, capturing a second image of the first eye the second period after capturing the image of the second eye, determining that an eye event has occurred based on a difference between the first and second images of the first eye, and performing at least one action if it is determined that that an eye event has occurred.

Optionally, the difference between first and second images comprises a difference in at least one characteristic for use in determining a gaze direction of the user. Optionally, the characteristic is related to the position of at least one corneal reflection from the eye. Optionally, the characteristic is related to the position of a pupil of the user. Optionally, the method further comprises determining that the eye event is the start of a saccade based on a difference between the first and second images.

Optionally, performing at least one action comprises determining an anticipated gaze point of the user. Optionally, the method comprises determining the anticipated gaze point based on at least one image captured after the start of the saccade. Optionally, the anticipated gaze point is determined based on captured images of the first and second eyes. Optionally, determining the anticipated gaze point comprises weighting later-captured images more heavily than earlier-captured images.

Optionally, the difference between first and second images comprises a difference in at least one characteristic for use in determining an eye openness of the user. Optionally, the characteristic is at least one of a pixel intensity of the first and second images, a number of corneal reflections shown in the first and second images, an obscured area of the pupil of the user, or an obscuration of the centre of the pupil of the user. Optionally, the method further comprises determining that the eye event is a blink based on an eye openness of the user. Optionally, performing at least one action comprises adjusting a power level of an associated device based on the eye openness.

Optionally, determining that an eye event has occurred comprises comparing the difference between the first and second images of the first eye to a threshold, and determining that an eye event has occurred if the difference is above the threshold. Optionally, capturing the images of the first eye is performed using at least one first image capture device, and capturing the image of the second eye is performed using at least one second image capture device.

In accordance with another aspect of the disclosure, there is provided an eye tracking system comprising at least one first image capture device configured to capture images of a first eye of a user, at least one second image capture device configured to capture images of a second eye of the user, and a processor, wherein the system is configured to capture a first image of the first eye, capture a first image of the second eye a first period after capturing the first image of the first eye and a second period before capturing a next image of the first eye, capture a second image of the first eye the second period after capturing the first image of the second eye, determine that an eye event has occurred based on a difference between the first and second images of the first eye, and perform at least one action if it is determined that that an eye event has occurred. Optionally, a head-mountable apparatus comprises the eye tracking system.

In accordance with another aspect of the disclosure, there is provided a computer program comprising instructions which, when executed on at least one processor, cause the at least one processor to control an eye tracking system to capture a first image of a first eye of a user, capture a first image of a second eye of the user a first period after capturing the first image of the first eye and a second period before capturing a next image of the first eye, capture a second image of the first eye the second period after capturing the first image of the second eye, determine that an eye event has occurred based on a difference between the first and second images of the first eye, and perform at least one action if it is determined that that an eye event has occurred. Optionally, a carrier containing the computer program is one of an electronic signal, optical signal, radio signal, or computer readable storage medium.

By taking this approach, many advantages are realised. For example, faster detection of eye events can improve the performance of gaze prediction and foveated rendering. The recovery time after a blink occurs, when a gaze point cannot be detected, is also reduced. In some cases, the frame rates of the individual cameras can be reduced without reducing the overall frame rate of the system. This can reduce the power consumption and processing load of the system. In some cases, a balance can be struck between a reduction of latency and a reduction of power consumption and processing load by setting the frame rates of the cameras appropriately.

BRIEF DESCRIPTION OF THE DRAWINGS

Exemplary embodiments of the disclosure shall now be described with reference to the drawings in which.

Throughout the description and the drawings, like reference numerals refer to like parts.

SPECIFIC DESCRIPTION

Figure 1A:
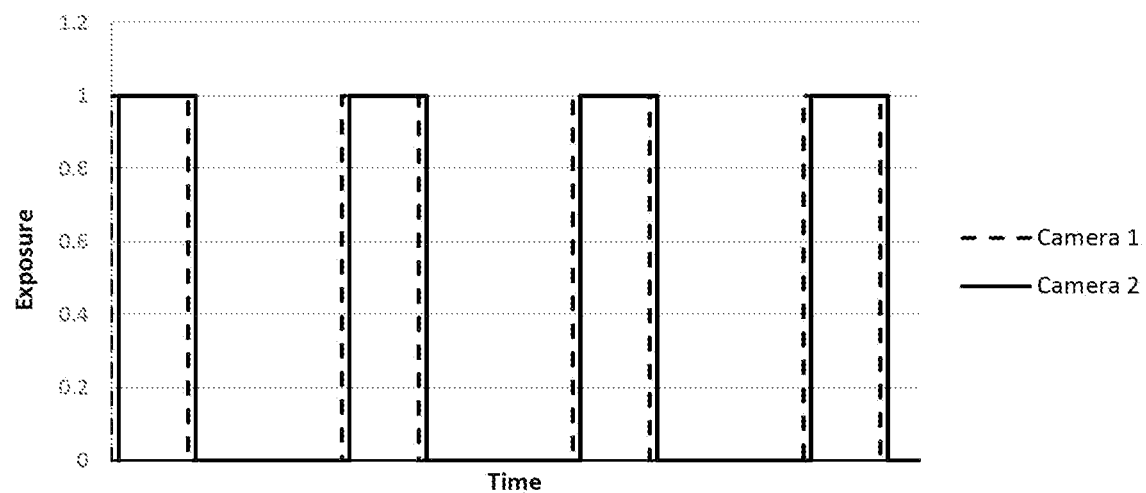
FIG. 1a graphically illustrates camera exposure over time for an image capture regime according to prior art systems.

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those users skilled in the art.

Eye tracking systems use the gaze of a user to control an apparatus, for example by determining a gaze point of a user and interacting with an icon on a screen when the user's gaze point is on that icon. The apparatus could be any apparatus capable of being controlled by the gaze of a user, for example a desktop computer, laptop computer, smartphone, tablet, on-board computing device of a vehicle, virtual reality (VR) headset or augmented reality (AR) glasses. Control of the apparatus may be achieved using pupil centre corneal reflection (PCCR). Such an approach is known in the art and will be discussed only in brief detail here. An eye tracking system used to control an apparatus may comprise at least one image capture device and at least one illuminator. In some embodiments, at least two illuminators are present at known relative positions. The at least one illuminator illuminates an eye of a user with light, for example infrared light, and uses the image capture device to detect reflection of the light from the eye. A processor may use the data from the image capture device to calculate, or otherwise determine, the direction of the user's gaze, based on the knowledge of the position of each of the at least one image capture device and the illuminator(s). This can result in a precise determination of where the user is looking within the working range of the eye tracking system. Eye tracking devices and methods, sometimes referred to as gaze detection systems and methods, include, for example, products produced and available from Tobii Technology AB, and which operate by using infrared illumination and an image sensor to detect reflection from the eye of a user. An example of such a gaze detection system is described in U.S. Pat. No. 7,572,008. Other alternative gaze detection systems may also be employed by the invention, regardless of the technology behind the gaze detection system. An eye tracking device may employ its own processor or the processor of another device to interpret and process data received. When an eye tracking device is referred to herein, both possible methods of processing data are referred to.

In some cases, in addition to tracking the gaze point of a user, it can be useful to determine the point in time that an eye event occurs. An eye event can be described as an event associated with some movement of part of the user's eye. One example of an eye event is the start of a saccade, where a user's gaze moves from one fixed point to another. Another example of an eye event is the end of a saccade. Yet another example of an eye event is a blink.

To determine when eye events occur, eye tracking systems monitor images of the eyes of a user to determine if there are any differences between them. A difference between successive images can be indicative that an eye event has occurred. In particular, certain characteristics of the images can be monitored to determine if an eye event has occurred.

In some examples, a characteristic for use in determining a gaze direction of the user can be monitored. Examples of such characteristics include the position of a pupil, pupil edge, or iris of the user's eye. In some instances, these characteristics can be monitored based on their relative positions to at least one corneal reflection, such as in a PCCR system as discussed above. As long as the user's head stays in a stationary position relative to an illuminator of the eye tracking system, the corneal reflection will always be in the same place. Therefore, movement of features of the eye relative to the reflection are indicative of movements of the eyeball of the user. Alternatively, an image capture device such as a camera can be used to capture images of the eyes and machine learning algorithms can be trained and used to determine a gaze point based on the images. These characteristics can be used to determine eye events related to saccades.

In some examples, a characteristic for use in determining an eye openness of the user can be monitored. Examples of such characteristics include the pixel intensity of the images, a number of corneal reflections shown in successive images, an obscured area of the pupil of the user, or an obscuration of the centre of the pupil of the user. These characteristics can be used to determine eye events related to blinks or drowsiness of a user.

As discussed above, successive images of the eyes must be captured in order to detect images between them and thus the occurrence of an eye event. FIG. 1a graphically illustrates exposure over time for an image capture regime according to a prior art system. In FIG. 1a, exposure with a value of 1 indicates that an image is being captured. As shown in FIG. 1a, a first image capture device corresponding to a first eye captures images at regular intervals ("Camera 1", represented by a dotted line). A second image capture device corresponding to a second eye also captures images at regular intervals ("Camera 2", represented by a solid line). The intervals may correspond to the frame rates of the image capture devices, and/or be determined in part by a maximum or default frame rate of the image capture devices. The image capture by the two image capture devices is substantially synchronised, such that images of each eye are captured substantially simultaneously. Whilst a small delay is shown between the image capture of the two image capture devices, this is principally for illustration purposes and, in many cases, the image capture is exactly synchronised.

Figure 1B:
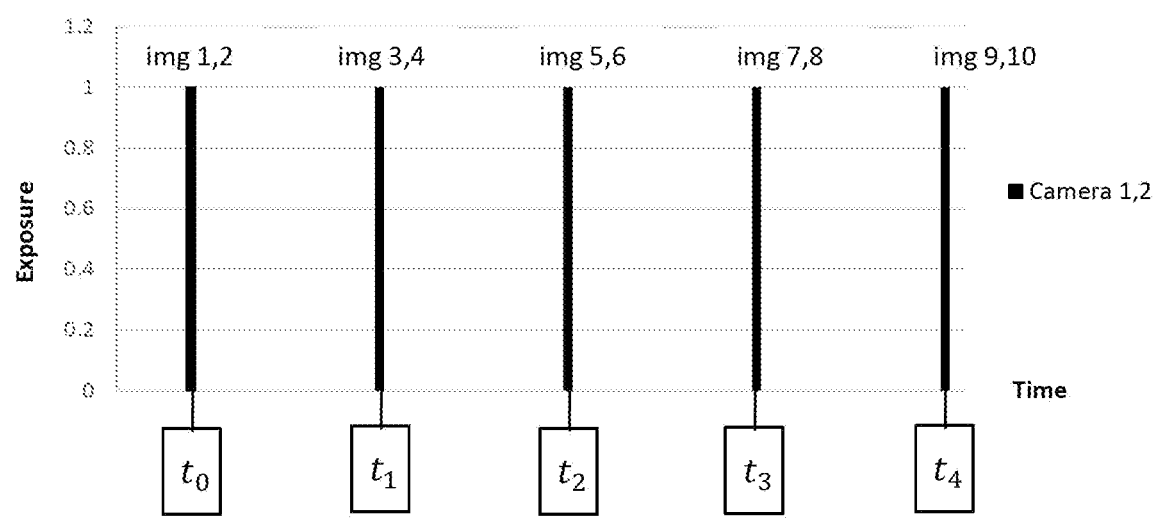
FIG. 1b graphically illustrates camera exposure over time for an image capture regime according to prior art systems FIG. 2a graphically illustrates camera exposure over time for an image capture regime according to an embodiment.

FIG. 1b shows the image capture regime shown in FIG. 1a in another format. It is shown that images of two eyes are taken simultaneously. For example, "img 1" of a first eye is taken at the same time as "img 2" of a second eye, specifically at to. Similarly, other images of the first eye ("img 3", "img 5", "img 7" and "img 9") are taken at the same times ($t_1$, $t_2$, $t_3$, $t_4$) as corresponding images of the second eye ("img 4", "img 6", "img 8" and "img 10"). Successive images are then analysed to determine if an eye event has occurred, based on detecting a difference between images. For example, "img 2" taken at to may be compared to "img 4" taken at $t_1$ to determine if a difference in any characteristics of the images is present. If an eye event occurs between $t_0$ and $t_1$, it will be detected at $t_1$. However, if the eye event occurs just after $t_1$, a difference in images will be not apparent until $t_2$ when "img 6" is taken. This means that an eye event that occurs just after $t_1$ can't be processed until after $t_2$. Therefore, there is some latency between the eye event occurring and it being detected and processed by the system.

Figure 2A:
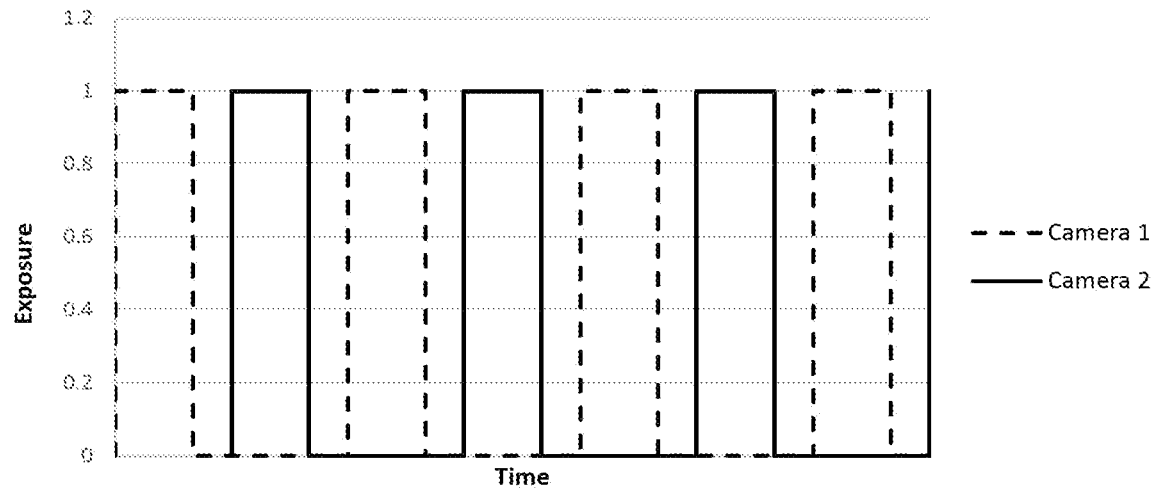
FIG. 2b graphically illustrates camera exposure over time for an image capture regime according to an embodiment.
Figure 2B:
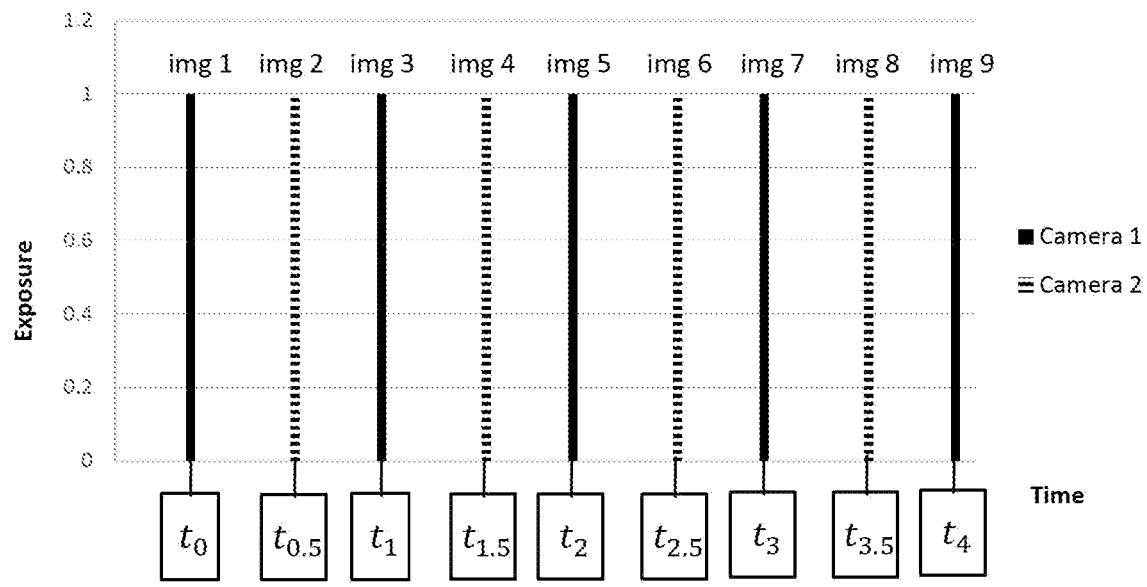

FIG. 2a graphically illustrates exposure over time for an image capture regime according to an embodiment of the present disclosure. In this case, the image capture of the two image capture devices is interlaced, such that images from a first image capture device corresponding to a first eye ("Camera 1", represented by a dotted line) are taken between successive images from second image capture device corresponding to a second eye ("Camera 2", represented by a solid line), and vice versa. FIG. 2b shows the image capture regime shown in FIG. 2a in another format. It is shown that images of two eyes are taken alternately. For example, "img 1" of a first eye is taken at a first time to, while "img 2" of a second eye is taken at a second time $t_{0.5}$. A second image of the first eye, "img 3", is taken at a third time $t_1$. This may continue such that further images of the first eye ("img 5", "img 7" and "img 9" taken at respective times $t_2$, $t_3$, $t_4$) are taken alternately with images of the second eye ("img 4", "img 6", and "img 8" taken at respective times $t_{1.5}$, $t_{2.5}$, $t_{3.5}$).

Similarly to the implementation of FIGS. 1a and 1b, successive images of a given eye are analysed to determine if an eye event has occurred, based on detecting a difference between images. For example, "img 2" may be compared to "img 4" to determine if a difference in any characteristics of the images of the second eye is present. This may be done in the same way as in the example of FIG. 1b. However, in the implementation shown in FIGS. 2a and 2b, if an eye event occurs just after $t_1$, a difference in images will be apparent at $t_{1.5}$, as "img 2" and "img 4" will be different. Therefore, an eye event that occurs just after $t_1$ can be detected at $t_{1.5}$, rather than in the case shown in FIGS. 1a and 1b, where it cannot be detected until $t_2$. Therefore, the latency between the eye event occurring and it being detected and processed by the system is reduced.

In FIGS. 2a and 2b, each image capture device is shown as capturing images at regular intervals. In some embodiments, the images of a given eye can be taken halfway between successive images of the other eye. That is to say the period between each image capture performed by the system is substantially equal. For example, the difference between $t_0$ and $t_{0.5}$ is the same as the difference between $t_{0.5}$ and $t_1$, and so on. In some embodiments, each image capture device may operate at its default or maximum frame rate. That is to say, that the period between $t_0$ and $t_1$ is the time between frames at the default or maximum frame rate of the first image capture device. Similarly, the period between $t_{0.5}$ and $t_{1.5}$ may be the time between frames at the default or maximum frame rate of the second image capture device. In an example where the frame rate of each image capture device is 120 fps (frames per second), the effective system frame rate (i.e., the rate at which the whole system captures images) would be increased from 120 fps to 240 fps. As such, image capture by the system can be performed at twice the operating frame rate of the first and second image capture devices. This can reduce the latency between an eye event occurring and it being detected by the system, which can improve the performance of gaze prediction and foveated rendering. During a blink, a gaze point cannot be detected. Using the approach discussed above, the recovery time after a blink occurs may also be reduced.

In other embodiments, each image capture device may operate at half of its default or maximum frame rate. That is to say, after capturing an image at to, the first image device may be capable of capturing an image at $t_{0.5}$ at its default or maximum frame rate, but does not capture an image until $t_1$. Similarly, after capturing an image at $t_{0.5}$, the second image device may be capable of capturing an image at $t_1$ at its default or maximum frame rate, but does not capture an image until $t_{1.5}$. As such, the operating frame rate of each image capture device is halved, but the overall system frame rate is maintained. In an example where the frame rate of each image capture device is reduced from 120 fps to 60 fps, the effective system frame rate would be maintained at 120 fps. The overall system latency would be maintained at current levels, so current gaze estimation and foveated rendering techniques would still be supported. However, the power consumption and processing load of the system would be reduced as only one image capture device is operated at a time, rather than both simultaneously.

It will be appreciated that other frame rates up to the maximum frame rates of the image capture devices can be used. By setting the frame rates of the individual image capture devices appropriately, a balance can be struck between a reduction of latency and a reduction of power consumption and processing load. For example, if the frame rate of each image capture device is reduced from 120 fps to 80 fps, the effective system frame rate would be increased from 120 fps to 160 fps, and the power and processing requirements would be reduced. It will be also appreciated that images could be captured at irregular intervals. The effects of interlacing imaging of the eyes can still be achieved even if the images are not captured at regular intervals.

Figure 3A:
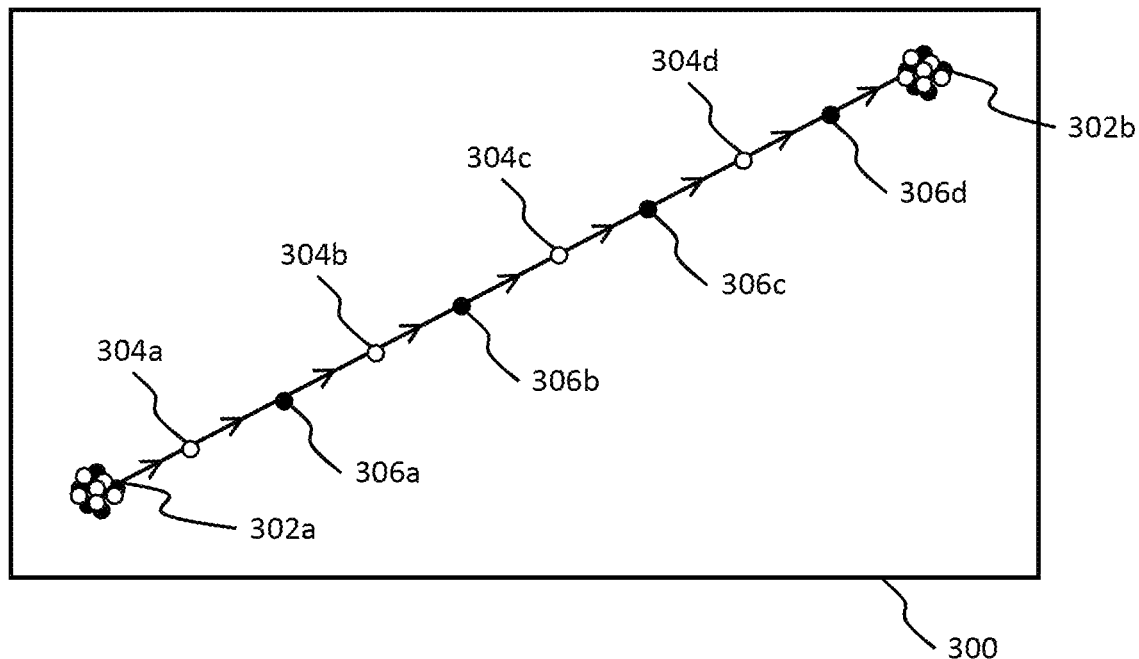
FIG. 3a schematically illustrates image capture points during a saccade, according to an embodiment.

FIG. 3a schematically illustrates image capture points during a saccade, according to an example of the image capture regime described in relation to FIGS. 2a and 2b. In the example of FIG. 3a, user is looking at a screen 300 and an eye tracking system captures images of the user's eyes in order to determine gaze positions of the user. Gaze positions corresponding to image captures of a first eye are shown by white-filled dots, while gaze positions corresponding to image captures of a second eye are shown by black filled dots.

As shown in FIG. 3a, the user's gaze is initially focused at a first gaze point 302a. The eye tracking system captures a number of images of both the first and second eyes while the user's gaze is focused at the first gaze point 302a. The user's gaze may fluctuate while the user is focused on the first gaze point 302a due to natural fluctuations in the eye, and so a number of images may be captured that correspond to a cluster of gaze positions around the first gaze point 302a. A saccade may then occur, where the user's gaze switches from the first gaze point 302a to a second gaze point 302b. Similarly to the first gaze point 302a, the user's gaze may fluctuate while the user is focused on the second gaze point 302b, and so a number of images may be captured that correspond to a cluster of gaze positions around the second gaze point 302b.

In some embodiments, all images used to calculate the output gaze point are weighted equally. In other embodiments, later captured images may be weighted more heavily than earlier captured images when calculating the output gaze point. In some embodiments, if the user is not in a saccade, current eye tracking data from one eye and past eye tracking data from the other eye can be used to create a combined gaze signal. This is possible as current eye tracking data is likely to be similar or the same as past eye tracking data when the user's gaze is focused at a gaze point. Therefore, to save resources, only one eye needs to be monitored until it is determined that the gaze is moving.

In some embodiments, a fixation filter can be used while the user's gaze is focused upon a gaze point 302a, 302b. A fixation filter is part of the eye tracking system that is configured to output a filtered gaze point from a number of captured images, for example an average gaze point such as a median gaze point. For example, median x and y values of the gaze points determined from a number of previously captured images can be calculated to output a median gaze point. A predetermined number of images may be used as an input to the fixation filter, for example between four and twenty images, such that only the most recent images are used and the output gaze point is kept up to date. Once it is determined that the gaze point of the user is moving, the fixation filter may be switched off until a next gaze point is determined. In some examples, the fixation filter may also monitor the pixel intensity in captured images and, based on a change in pixel intensity between successive images, determine that the user is no longer focused on the gaze point.

Returning to FIG. 3a, as the saccade occurs, a number of images of each eye are captured between the two gaze points 302a, 302b as the user's gaze moves across the screen 300. In the example shown in FIG. 3a, images of a first eye and images of a second eye are captured at various points across the saccade. For example, four images of the first eye may be captured when the gaze is directed towards respective gaze positions 304a-d between the first gaze point 302a and second gaze point 302b. Similarly, four images of the second eye may be captured when the gaze is directed towards respective gaze positions 306a-d between the first gaze point 302a and second gaze point 302b. It will be appreciated that more or fewer images may be captured dependent on the length and speed of the saccade and the operating frame rate of the image capture devices being used to capture the images.

Compared to previous eye tracking systems, where image capture of the eyes is synchronised, the disclosed method allows a larger number of images to be captured during a saccade. For example, were the image capture illustrated in FIG. 3a to be synchronised, as described in relation to FIGS. 1a and 1b, images of the first eye would only be captured at the same time as images of the second eye. For example, the image of the first eye captured when the user's gaze passes position 304a would not be captured until the user's gaze passes position 306a. As such, the gaze of the user would only be determined on four occasions during the saccade, rather than on eight occasions, as achieved by the method used in FIG. 3a. Interlacing the cameras in time during image capture allows for gaze information to be determined more often during eye events such as saccades and blinks. Therefore, monitoring of such events can be kept up to date as more data points are available.

Furthermore, onset of the saccade may be detected earlier. As shown in FIG. 3a and discussed above, the eye tracking system may capture a number of images of both the first and second eyes while the user's gaze is focused at the first gaze point 302a. After a saccade begins, the next image of the first eye that is taken is the image taken when the user's gaze passes position 304a. Therefore, the system can already determine a difference between successive images of the first eye: the latest image taken while the user's gaze is focused at the first gaze point 302a, and the next image taken when the user's gaze passes position 304a. The start of a saccade can then be determined. As discussed above, were the image capture illustrated in FIG. 3a to be synchronised, the first image after the saccade begins would not be taken until the user's gaze passes position 306a. Therefore, the start of a saccade could not be determined until after the images taken when the user's gaze passes position 306a are captured. As such, interlacing image capture as disclosed in the present application allows earlier detection of the start of a saccade.

Once it has been determined that a saccade is underway, the eye tracking system can perform further actions based on the captured images. For example, the system can determine an anticipated gaze point of the user. This can be achieved by determining a distance of eye movement between successive images. The rate of change of the gaze point of the user during a saccade, also referred to as the velocity or speed of the saccade, is directly dependent on the total movement during a saccade (the amplitude of the saccade). Thus, as the intended amplitude of a user's saccade increases, so does the speed of the saccade. Therefore, in some embodiments, the distance of eye movement between successive images can be used to determine the velocity of a saccade, which can in turn be used to determine the amplitude of the saccade. This can be done using images captured after the start of the saccade. As the required images are available sooner when image capture is interlaced, an anticipated gaze point can be determined more quickly. In some embodiments, captured images of one eye may be used. In other embodiments, captured images of both eyes may be used. In some embodiments, all images used to calculate the determined gaze point are weighted equally. In other embodiments, later captured images may be weighted more heavily than earlier captured images when calculating the anticipated gaze point. Weighting could be applied as soon as it is suspected that a saccade is underway, and then the weighting of later images could be increased when the confidence increases that a saccade is occurring. In yet other embodiments, once it has been determined that a saccade is underway, it may be tracked by only taking the latest image into account, as only one image is necessary to determine a gaze direction.

In another example, once it has been determined that a saccade is underway, the eye tracking system may exit a fixation filter that was in operation whilst the user's gaze was focused on a gaze point. As discussed above, a fixation filter is part of the eye tracking system that is configured to output a filtered gaze point from a number of captured images, for example an average gaze point such as a median gaze point. Once it is determined that the gaze point of the user is moving, the fixation filter may be switched off until a next gaze point is determined.

Successive images can also be used to determine that the saccade is ending. This could be achieved, for example, by using an anticipated gaze point to determine that a saccade is approaching an end, or by detecting that successive image captures represent gaze positions that are getting closer together thus indicating a slowing down of the saccade. Once it has been determined that a saccade is ending, the eye tracking system may switch on a fixation filter to operate whilst the user's gaze is focused at the gaze point at the end of the saccade.

As discussed above, another type of eye event that may be detected by the system is a blink. A blink can be detected based on characteristics of successive images related to the eye openness of the user. As discussed above, examples of such characteristics include the pixel intensity of the images, a number of corneal reflections shown in successive images, an obscured area of the pupil of the user, or an obscuration of the centre of the pupil of the user. A fully open eye may produce a known number of corneal reflections. If it is determined from successive images that the number of reflections is decreasing, then it can be determined that a blink is occurring.

In response to the detection of a blink, the eye tracking system can perform further actions. In one example, the action may comprise adjusting a power level of an associated device. For example, if it is determined that the user is performing a blink, it is known that useful eye tracking data cannot be collected. Therefore, certain components of the eye tracking system may be momentarily put into a low power mode until it is determined that the blink has finished and useful eye tracking data can be collected again. As such, adjusting the power level can be performed based on the eye openness. As the eye is closing, the power level can be reduced, and as the eye is opening, the power level can be increased. This reduces power consumption during operation of the eye tracking system. Similarly, as it can be detected that an eye is opening again at the end of a blink, the recovery time after a blink occurs, when a gaze point cannot be detected, may also be reduced.

In order to avoid false positives when it comes to determining the occurrence of an eye event, a difference between successive images of an eye may be compared to a threshold. For example, a difference may be present between successive images at a gaze point due to fluctuations in the eye, as discussed in relation to FIG. 3a, but this may not be indicative that an eye event is occurring. Therefore, the system may apply a threshold when assessing the difference between images. For example, a threshold distance of pupil movement with respect to a corneal reflection may be set, and compared to the difference between the positions of the pupil in relation to a corneal reflection in successive images of the eye. In another example, a threshold number of corneal reflections may be set, and compared to the difference in the number of corneal reflections in successive images of the eye. A threshold may be set such that differences due to natural fluctuations of the eye are below the threshold and do not result in the determination that an eye event has occurred.

Figure 3B:
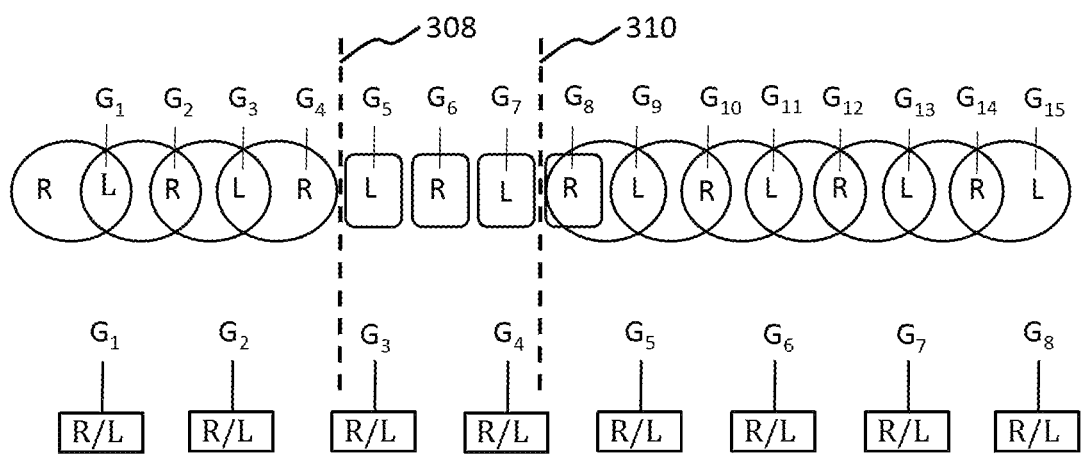
FIG. 3b illustrates an image capture regime according to an embodiment.

FIG. 3b illustrates another example of the image capture regime described in relation to FIGS. 2a and 2b compared to a prior art image capture regime. As shown in the upper row, images of left and right eyes are taken alternately. At $G_1$, the first respective images of the left and right eye are used in tandem to determine a gaze point. In this example, the determined gaze point could be a first gaze point 302a as shown in FIG. 3a. In some embodiments, the later image is weighted more heavily than the earlier image in the determination of the gaze point. In this case, at $G_1$, the first image of the left eye would be weighted more heavily than the first image of the right eye. A similar approach for determining a gaze point is used at $G_2$ to $G_4$.

At point 308, an eye event occurs, such as the beginning of a saccade. At $G_5$ to $G_7$, only a single image is used to determine a gaze direction. Specifically, an image of the left eye is captured at $G_5$, an image of the right eye is captured at $G_6$, and an image of the left eye is captured at $G_7$. As discussed above, only one image is necessary to determine a gaze direction. In this way, the saccade can be detected earlier and monitored more often than in prior art systems that use synchronised image capture.

At point 310, it is determined that the saccade is over, and thus images of the left and right eye are again used in tandem to determine gaze positions, at points $G_8$-$G_{15}$. As the saccade is over, the gaze positions determined at points $G_8$-$G_{15}$ are likely to be at a gaze point such as the second gaze point 302b shown in FIG. 3a. Again, in some embodiments, later images are weighted more heavily than earlier images in the determination of the gaze point.

The lower row shows a prior art solution where images of both eyes are captured simultaneously, at image capture points $G_1$ to $G_8$. As can be seen from the comparison of the upper and lower rows of FIG. 3b, the prior art system is not able to capture eye tracking information as often, nor detect eye events as quickly, as the presently disclosed approach.

Figure 4:
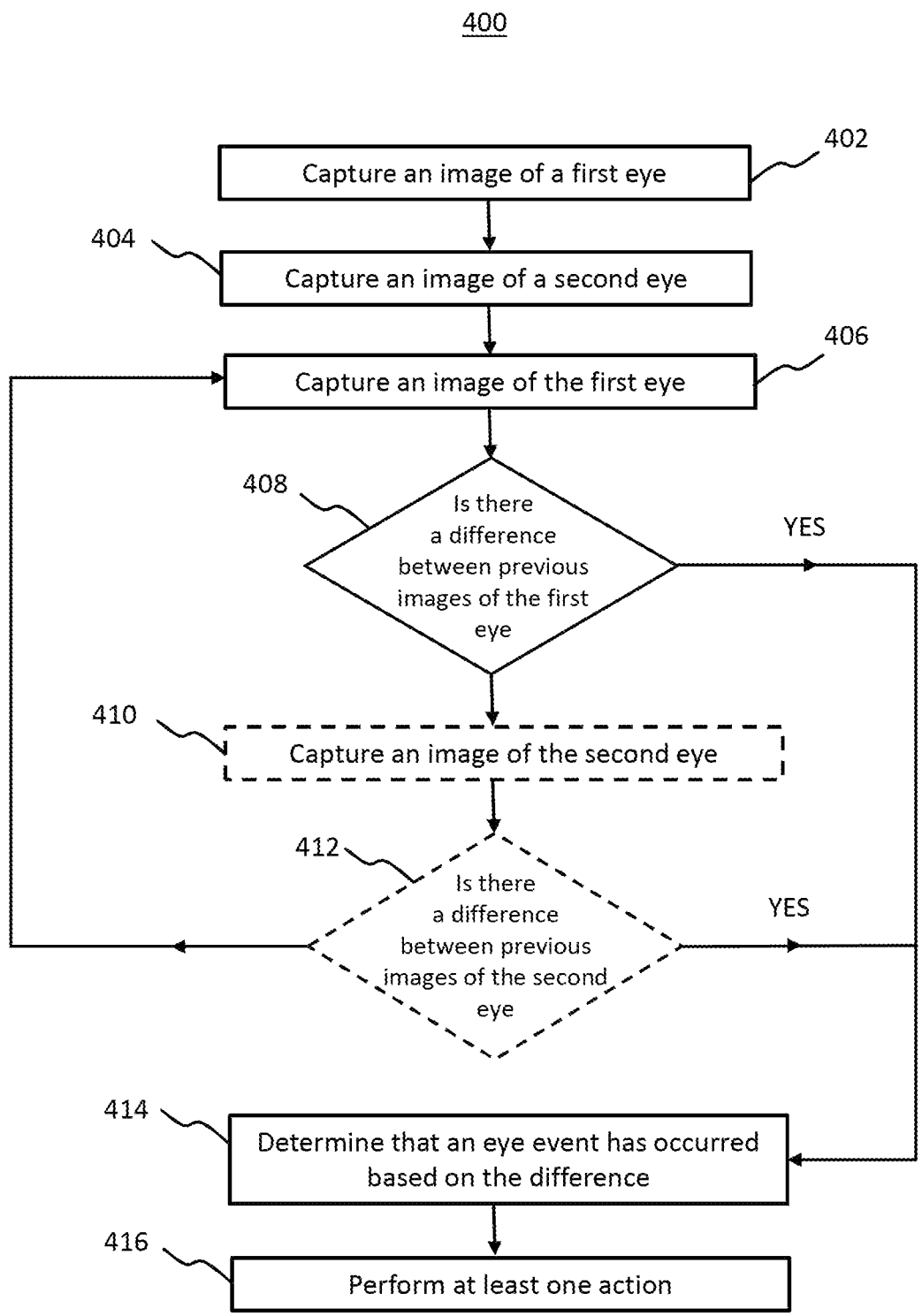
FIG. 4 is a flow chart illustrating a method for detecting an eye event of a user using an eye tracking system according to an embodiment.

FIG. 4 is a flow chart illustrating a method 400 for detecting an eye event of a user using an eye tracking system according to an embodiment. The method 400 is based on the interlacing of image capture discussed above, and can therefore reduce the latency present in current eye tracking systems.

At step 402, an image of a first eye of a user is captured. For example, this could be "img 1" shown in FIG. 2b. This can be performed by a first image capture device of the eye tracking system. The image of the first eye may have characteristics that can be used in determining a gaze direction of the user and/or an eye openness of the user, as discussed above.

At step 404, an image of a second eye of a user is captured. For example, this could be "img 2" shown in FIG. 2b. This image is captured a first period after capturing the image of the first eye and a second period before capturing a next image of the first eye. That is to say, the image of the second eye is captured between successive images of the first eye. A second image capture device of the eye tracking system, distinct from the first image capture device, can be used to capture images of the second eye. Similarly to the image of the first eye, the image of the second eye may have characteristics that can be used in determining a gaze direction of the user and/or an eye openness of the user.

At step 406, a next image of the first eye of a user is captured. For example, this could be "img 3" shown in FIG. 2b. This image is captured after the second period. That is to say, the image is captured after capturing the image of the second eye. This can be performed by a first image capture device of the eye tracking system. Similarly to the previous images, the image may have characteristics that can be used in determining a gaze direction of the user and/or an eye openness of the user.

After step 406, successive images of the first eye have been captured. Therefore, a determination can be made at step 408 if there is a difference between the images. The difference can be based on one or more of the characteristics of the images discussed above. For example, it can be determined if there is a difference between the positions of a pupil in relation to a corneal reflection in successive images of the first eye. In another example, it can be determined if there is a difference between the number of corneal reflections present in successive images of the first eye.

If it is determined that there is a difference between successive images of the first eye, the method 400 proceeds to step 414, which will be discussed below. In addition, or in the case that it is determined that there is no difference between successive images of the first eye, the method 400 proceeds to step 410. In this way, successive images of the first and second eyes continue to be captured alternately, as discussed in relation to FIGS. 2a and 2b, while the eye tracking system is in operation. This ensures that the eyes are monitored constantly for any differences between successive images that may be due to an eye event.

Optionally, at step 410, a next image of the second eye of a user is captured. For example, this could be "img 4" shown in FIG. 2b. This image is captured after a period after the previous image of the first eye is captured, and a period before a further image of the first eye is captured. That is to say, the next image of the second eye is captured between successive images of the first eye. Similarly to the previous images, this image may have characteristics that can be used in determining a gaze direction of the user and/or an eye openness of the user.

After step 410, successive images of the second eye have been captured. Therefore, optionally, a determination can be made at step 412 if there is a difference between the successive images of the second eye. The difference can be based on one or more of the characteristics of the images discussed above. For example, it can be determined if there is a difference between the positions of a pupil in relation to a corneal reflection in successive images of the second eye. In another example, it can be determined if there is a difference between the number of corneal reflections present in successive images of the second eye.

If it is determined that there is a difference between successive images of the second eye, the method 400 proceeds to step 414, which will be discussed below. In addition, or in the case that it is determined that there is no difference between successive images of the second eye, the method 400 returns to step 406. In this way, successive images of the first and second eyes continue to be captured alternately, as discussed in relation to FIGS. 2a and 2b, while the eye tracking system is in operation. This ensures that the eyes are monitored constantly for any differences between successive images that may be due to an eye event.

At step 414, it is determined that an eye event has occurred based on a difference between successive images of the first or second eye. As discussed above, a difference in a characteristic for use in determining a gaze direction of the user may be indicative that an eye event related to a saccade has occurred. A difference in a characteristic for use in determining an eye openness of the user may be indicative that an eye event related to a blink has occurred.

In some embodiments, a difference between successive images of an eye may be compared to a threshold. If the difference between the successive images is above the threshold, it can be determined that an eye event has occurred if the difference is above the threshold.

In one example, a threshold distance of pupil movement with respect to a corneal reflection may be set, and compared to the difference between the positions of the pupil in relation to a corneal reflection in successive images of the eye. In another example, a threshold number of corneal reflections may be set, and compared to the difference in the number of corneal reflections in successive images of the eye. For example, if a threshold number of corneal reflections is set at five to indicate an eye of the user is open, and successive images of the eye show six and four corneal reflections respectively, it can be determined that a blink is occurring or a user is becoming drowsy.

If it is determined that an eye event has occurred, the method 400 proceeds to step 416, which will be discussed below. If it is not determined that an eye event has occurred, for example if the difference does not meet the threshold, the method 400 may continue to capture images in the interlaced fashion discussed above.

At step 416, at least one action is performed based on the determination that that an eye event has occurred. The type of action may be based on the type of eye event that has occurred.

In one example, if it is determined that the event is the start of a saccade, the action may comprise determining an anticipated gaze point of a user. This can be achieved by determining a direction of eye movement based on the successive images. As such, the anticipated gaze point can be determined based on at least one image captured after the start of the saccade. In some embodiments, successive images of both eyes can be used to determine and monitor the gaze direction, to more accurately determining an anticipated gaze point. In some embodiments, later-captured images may be weighted more heavily than earlier-captured images.

In another example, if it is determined that the event is the start of a saccade, the action may comprise exiting a fixation filter that was in operation whilst the user's gaze was focused on a gaze point. As discussed above, a fixation filter is part of the eye tracking system that is configured to output a filtered gaze point from a number of captured images, for example an average gaze point such as a median gaze point. Once it is determined that the gaze point of the user is moving, the fixation filter may be switched off until a next gaze point is determined.

In another example, if it is determined that the event is the end of a saccade, the action may comprise switching on a fixation filter to operate whilst the user's gaze is focused at the gaze point at the end of the saccade.

In another example, if it is determined that the event is a blink, the action may comprise adjusting a power level of an associated device. For example, if it is determined that the user is performing a blink, it is known that useful eye tracking data cannot be collected. Therefore, certain components of the eye tracking system may be momentarily put into a low power mode until it is determined that the blink has finished and useful eye tracking data can be collected again. As such, adjusting the power level can be performed based on the eye openness. As the eye is closing, the power level can be reduced, and as the eye is opening, the power level can be increased. This reduces power consumption during operation of the eye tracking system.

An eye tracking system can be configured to implement the methods and techniques disclosed above. In some embodiments, such a system comprises one or more image capture devices for capturing images of a first eye of a user, and one or more image capture devices for capturing images of a second eye of the user. Capturing the images of the first eye may be performed using at least one first image capture device, and capturing the image of the second eye is performed using at least one second image capture device. The system may also comprise a processor. The system may also comprise a memory. In some embodiments, the system is configured to perform the method 400 disclosed in relation to FIG. 4. For example, the system may be configured to capture a first image of the first eye, capture a first image of the second eye a first period after capturing the first image of the first eye and a second period before capturing a next image of the first eye, capture a second image of the first eye the second period after capturing the first image of the second eye, determine that an eye event has occurred based on if there is a difference between the first and second images of the first eye, and perform at least one action if it is determined that that an eye event has occurred. In some embodiments, the system is implemented in a head-mountable apparatus, for example a virtual reality (VR) headset or an augmented reality (AR) headset. The headset may be a pair of glasses. In the example of a pair of glasses, the glasses may have one lens corresponding to each eye. Each lens may be associated with one or more image capture devices. For example, each lens may be associated with two image capture devices. This provides an increased number of image capture regimes. For example, say the two image capture devices associated with the lens for the left eye are denoted as $L_1$ and $L_2$, and the two image capture devices associated with the lens for the right eye are denoted as $R_1$ and $R_2$. One image capture regime to capture images of each eye alternately would be to use both image capture devices for a given eye simultaneously. That is, the image capture regime would be $L_1L_2$, $R_1R_2$, $L_1L_2$, and so on. Alternatively, individual image capture devices could be used and alternated to capture their respective eye. That is, the image capture regime would be $L_1$, $R_1$, $L_2$, $R_2$, $L_1$, and so on. It will be appreciated that other combinations and orders of image capture could be used to capture images of each eye alternately.

The methods and systems disclosed above allow the latency between an eye event occurring and it being detected and processed by an eye tracking system to be reduced. Faster detection of eye events can improve the performance of gaze prediction and foveated rendering. Parts of the system can be powered down during a blink when they do not need to operational, thus reducing the power consumption of the system. The recovery time after a blink occurs, when a gaze point cannot be detected, may also be reduced. By setting the frame rates of image capture devices appropriately, a system frame rate can be maintained whilst reducing the operation time of image capture devices, thus power consumption and processing load of the system. A balance can be struck between a reduction of latency and a reduction of power consumption and processing load.

Figure 5:
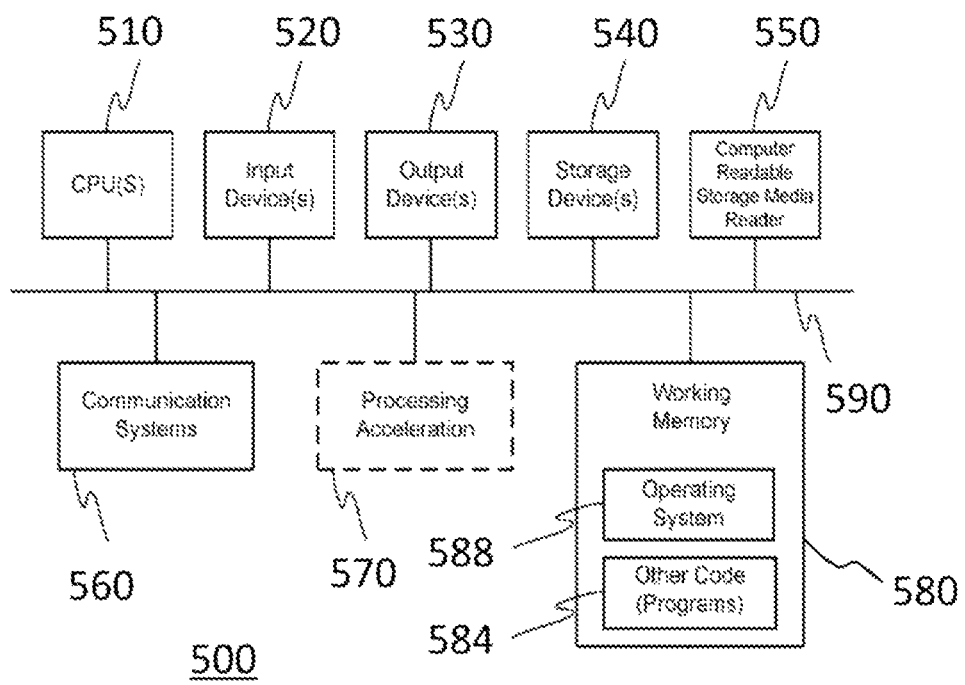
FIG. 5 is a block diagram of an exemplary computer system capable of being used in at least some portion of the devices or systems of the present invention, or implementing at least some portion of the methods of the present invention.

FIG. 5 is a block diagram illustrating an exemplary computer system 500 in which embodiments of the present invention may be implemented. This example illustrates a computer system 500 such as may be used, in whole, in part, or with various modifications, to provide the functions of the disclosed system. For example, various functions may be controlled by the computer system 500, including, merely by way of example, determining a user's gaze region, determining a user's gaze point, illuminating a device, dimming a display, etc.

The computer system 500 is shown comprising hardware elements that may be electrically coupled via a bus 590. The hardware elements may include one or more central processing units 510, one or more input devices 520 (e.g., a mouse, a keyboard, etc.), and one or more output devices 530 (e.g., a display device, a printer, etc.). The computer system 500 may also include one or more storage device 540. By way of example, the storage device(s) 540 may be disk drives, optical storage devices, solid-state storage device such as a random-access memory ("RAM") and/or a read-only memory ("ROM"), which can be programmable, flash-updateable and/or the like.

The computer system 500 may additionally include a computer-readable storage media reader 550, a communications system 560 (e.g., a modem, a network card (wireless or wired), an infra-red communication device, Bluetooth™ device, cellular communication device, etc.), and a working memory 580, which may include RAM and ROM devices as described above. In some embodiments, the computer system 500 may also include a processing acceleration unit 570, which can include a digital signal processor, a special-purpose processor and/or the like.

The computer-readable storage media reader 550 can further be connected to a computer-readable storage medium, together (and, optionally, in combination with the storage device(s) 540) comprehensively representing remote, local, fixed, and/or removable storage devices plus storage media for temporarily and/or more permanently containing computer-readable information. The communications system 560 may permit data to be exchanged with a network, system, computer and/or other component described above.

The computer system 500 may also comprise software elements, shown as being currently located within the working memory 580, including an operating system 588 and/or other code 584. It should be appreciated that alternate embodiments of a computer system 500 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of the computer system 500 may include code 584 for implementing any or all of the function of the various elements of the architecture as described herein. For example, software, stored on and/or executed by a computer system such as the system 500, can provide the functions of the disclosed system. Methods implementable by software on some of these components have been discussed above in more detail.

The invention has now been described in detail for the purposes of clarity and understanding. However, it will be appreciated that certain changes and modifications may be practiced within the scope of the appended claims.

The invention claimed is:

1. An eye tracking system comprising:
at least one first image capture device configured to capture images of a first eye of a user;
at least one second image capture device configured to capture images of a second eye of the user; and
a processor;
wherein the system is configured to:
capture a first image of the first eye;
capture a first image of the second eye a first period after capturing the first image of the first eye and a second period before capturing a next image of the first eye;
capture a second image of the first eye the second period after capturing the first image of the second eye;
determine that an eye event has occurred based on a difference between the first and second images of the first eye; and
perform at least one action if it is determined that that an eye event has occurred.

2. A head-mountable apparatus comprising the eye tracking system of claim 1.

3. A non-transitory computer-readable storage medium comprising instructions which, when executed on at least one processor, cause the at least one processor to control an eye tracking system to:
capture a first image of a first eye of a user;
capture a first image of a second eye of the user a first period after capturing the first image of the first eye and a second period before capturing a next image of the first eye;
capture a second image of the first eye the second period after capturing the first image of the second eye;
determine that an eye event has occurred based on a difference between the first and second images of the first eye; and
perform at least one action if it is determined that that an eye event has occurred.

4. A method for detecting an eye event of a user using an eye tracking system, the method comprising:
capturing a first image of a first eye of a user;
capturing an image of a second eye of the user a first period after capturing the first image of the first eye and a second period before capturing a next image of the first eye;
capturing a second image of the first eye the second period after capturing the image of the second eye;
determining that an eye event has occurred based on a difference between the first and second images of the first eye; and
performing at least one action if it is determined that that an eye event has occurred.

5. The method of claim 4, wherein the difference between first and second images comprises a difference in at least one characteristic for use in determining a gaze direction of the user.

6. The method of claim 5, wherein the characteristic is related to the position of at least one corneal reflection from the eye.

7. The method of claim 5, wherein the characteristic is related to the position of a pupil of the user.

8. The method of claim 5, further comprising determining that the eye event is the start of a saccade based on a difference between the first and second images.

9. The method of claim 8, wherein performing at least one action comprises determining an anticipated gaze point of the user.

10. The method of claim 9, comprising determining the anticipated gaze point based on at least one image captured after the start of the saccade.

11. The method of claim 10, wherein the anticipated gaze point is determined based on captured images of the first and second eyes.

12. The method of claim 9, wherein determining the anticipated gaze point comprises weighting later-captured images more heavily than earlier-captured images.

13. The method of claim 4, wherein the difference between first and second images comprises a difference in at least one characteristic for use in determining an eye openness of the user.

14. The method of claim 13, wherein the characteristic is at least one of a pixel intensity of the first and second images, a number of corneal reflections shown in the first and second images, an obscured area of the pupil of the user, or an obscuration of the centre of the pupil of the user.

15. The method of claim 13, further comprising determining that the eye event is a blink based on an eye openness of the user.

16. The method of claim 15, wherein performing at least one action comprises adjusting a power level of an associated device based on the eye openness.

17. The method of claim 4, wherein determining that an eye event has occurred comprises:
comparing the difference between the first and second images of the first eye to a threshold; and
determining that an eye event has occurred if the difference is above the threshold.

18. The method of claim 4, wherein:
capturing the images of the first eye is performed using at least one first image capture device; and
capturing the image of the second eye is performed using at least one second image capture device.

* * * * *